(12) United States Patent
Oh et al.

(10) Patent No.: US 12,224,124 B2
(45) Date of Patent: Feb. 11, 2025

(54) MULTILAYER ELECTRONIC COMPONENT

(71) Applicant: SAMSUNG ELECTRO-MECHANICS CO., LTD., Suwon-si (KR)

(72) Inventors: Young Joon Oh, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 124 days.

(21) Appl. No.: 18/131,032

(22) Filed: Apr. 5, 2023

(65) Prior Publication Data
US 2024/0203650 A1 Jun. 20, 2024

(30) Foreign Application Priority Data
Dec. 14, 2022 (KR) .................. 10-2022-0174726

(51) Int. Cl.
*H01G 4/12* (2006.01)
*H01G 4/008* (2006.01)
*H01G 4/012* (2006.01)
*H01G 4/30* (2006.01)

(52) U.S. Cl.
CPC ........... *H01G 4/1227* (2013.01); *H01G 4/008* (2013.01); *H01G 4/012* (2013.01); *H01G 4/30* (2013.01)

(58) Field of Classification Search
CPC .......... H01G 4/008; H01G 4/012; H01G 4/12; H01G 4/1209; H01G 4/1227; H01G 4/30
See application file for complete search history.

(56) References Cited

U.S. PATENT DOCUMENTS

2017/0154733 A1 6/2017 Lee et al.
2021/0118617 A1 4/2021 Morita

FOREIGN PATENT DOCUMENTS

KR 10-2017-0062087 A 6/2017
KR 10-2021-0045925 A 4/2021
KR 10-2022-0111140 A 8/2022

OTHER PUBLICATIONS

Chungfeng Hu, et al., "Physical and Mechanical Properties of Bulk Ta4AlC3 Ceramic Prepared by an In Situ Reaction Synthesis/Hot-Pressing Method", J. Am. Ceram. Soc., 90 [8], pp. 2542-2548 (2007).
Yi He, "Heat capacity, thermal conductivity, and thermal expansion of barium titanate-based ceramics", Thermochimica Acta 419 (2004), pp. 135-141.

*Primary Examiner* — Nathan Milakovich
(74) *Attorney, Agent, or Firm* — MORGAN, LEWIS & BOCKIUS LLP (57) ABSTRACT

A multilayer electronic component includes a body including a first dielectric layer and internal electrodes alternately disposed with the first dielectric layer interposed therebetween in a first direction; and external electrodes disposed on the body. The internal electrodes include body portions alternately disposed with the first dielectric layer in the first direction to form capacitance, and end portions extending from the body portions in the second direction. A region including the first dielectric layer and the body portions in the body is a capacitance forming portion. Regions disposed on one surface and the other surface of the capacitance forming portion in the second direction and including the end portions of the internal electrodes is first margin portions. The first margin portions are disposed between the end portions of the internal electrodes and include a second dielectric layer including $Ta_4AlC_3$.

22 Claims, 5 Drawing Sheets

MULTILAYER ELECTRONIC COMPONENT

CROSS-REFERENCE TO RELATED APPLICATION

This application claims benefit of priority to Korean Patent Application No. 10-2022-0174726 filed on Dec. 14, 2022 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer ceramic capacitor (MLCC), a multilayer electronic component, is a chip-type capacitor mounted on the printed circuit boards of various types of electronic products, such as imaging devices including liquid crystal displays (LCDs) and plasma display panels (PDPs), computers, smartphones, cell phones, and the like, to allow electricity to be charged therein and discharged therefrom.

A body of the multilayer ceramic capacitor may be formed by alternately disposing internal electrodes and dielectric layers and then compressing and sintering the body. At this time, in order to connect the ends of the alternately disposed internal electrodes to external electrodes having different polarities, the internal electrodes adjacent to each other in a stacking direction need to extend in opposite directions toward surfaces of the body opposing each other. That is, the body of the multilayer ceramic capacitor includes a capacitance forming portion in which internal electrodes are disposed to form capacitance and a margin portion in which capacitance is not formed, and the margin portion may also include a margin portion including internal electrodes and a margin portion not including internal electrodes. Since the capacitance forming portion and the margin portion have different lamination degrees of the internal electrodes, when the compression process described above is performed, even pressure may not be applied to the entire body, making it difficult to secure sufficient adhesion between the ends of the internal electrodes and the external electrodes. Thereafter, as a sintering process is performed, a step portion may occur due to a difference in thermal expansion and contraction due to a difference in thermal expansion coefficients between the capacitance forming portion and the margin portion.

SUMMARY

An aspect of the present disclosure may provide a multilayer electronic component in which a problem in which a step portion occurs during compression and sintering due to a difference in thermal expansion coefficients of a capacitance forming portion and a margin portion is solved.

Another aspect of the present disclosure may provide a multilayer electronic component in which a problem in which an end of an internal electrode may be bent due to a step portion difference between a capacitance forming portion and a margin portion is solved.

However, the object of the present disclosure is not limited to the above and may be more easily understood in the process of describing specific embodiments of the present disclosure.

According to an aspect of the present disclosure, a multilayer electronic component includes a body including a first dielectric layer and internal electrodes alternately disposed with the first dielectric layer interposed therebetween in a first direction, the body comprising first and second surfaces opposing each other in the first direction, third and fourth surfaces connected to the first and second surfaces and opposing each other in a second direction, and fifth and sixth surfaces connected to the first to fourth surfaces and opposing each other in a third direction; and external electrodes disposed on the third and fourth surfaces, wherein the internal electrodes include body portions alternately disposed with the first dielectric layer in the first direction to form capacitance, and end portions extending from the body portions in the second direction, and a region including the first dielectric layer and the body portions in the body is a capacitance forming portion, regions disposed on one surface and the other surface of the capacitance forming portion in the second direction and including the end portions of the internal electrodes are first margin portions, and at least one of the first margin portions includes a second dielectric layer including $Ta_4AlC_3$, and the second dielectric layer is disposed between the end portions of the internal electrodes.

According to an aspect of the present disclosure, a multilayer electronic component includes a body including: a capacitance forming portion including: a first dielectric layer, and internal electrodes alternately disposed with the first dielectric layer interposed therebetween in a first direction, and a first margin portion disposed on opposing surfaces of the capacitance forming portion, the first margin portion including: a second dielectric layer including $Ta_4AlC_3$, and end portions of the internal electrodes; and external electrodes disposed on the body.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

In the drawing, a first direction is a direction in which first and second internal electrodes are alternately disposed with a dielectric layer interposed therebetween or a thickness (T)

direction, and, among a second direction and a third direction perpendicular to the first direction, the second direction may be defined as a length (L) direction and the third direction may be defined as a width (W) direction.

Figure 1:
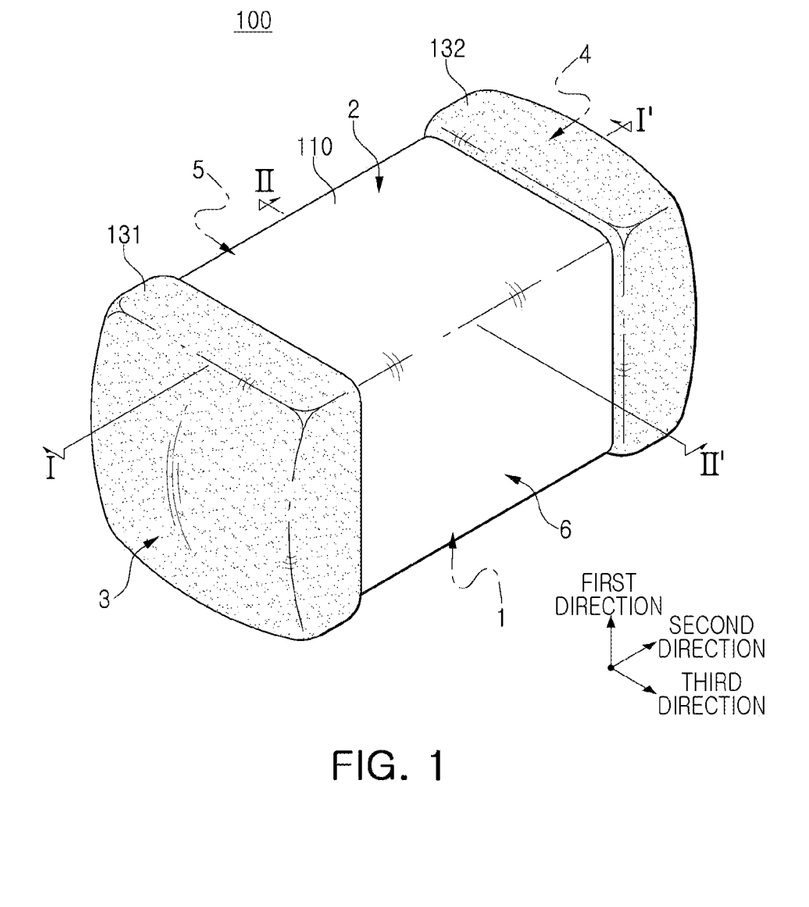
FIG. 1 is a perspective view illustrating a multilayer electronic component according to an exemplary embodiment in the present disclosure.
Figure 2:
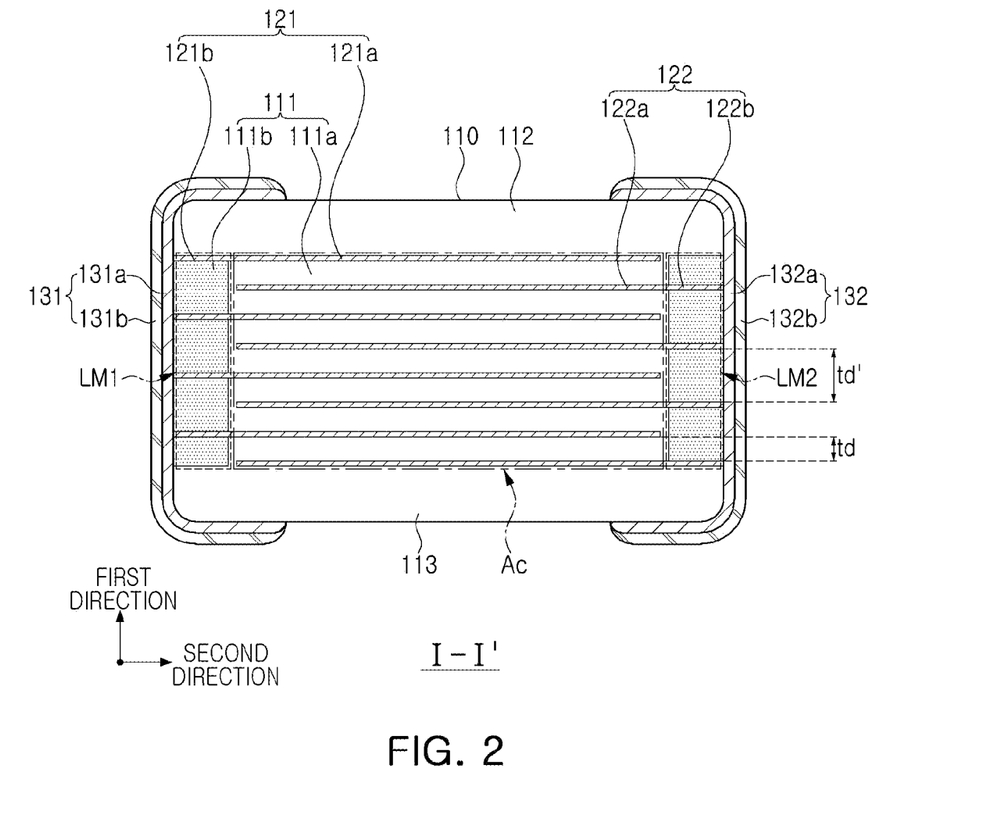
FIG. 2 is a cross-sectional view of FIG. 1, taken along line I-I'.
Figure 3:
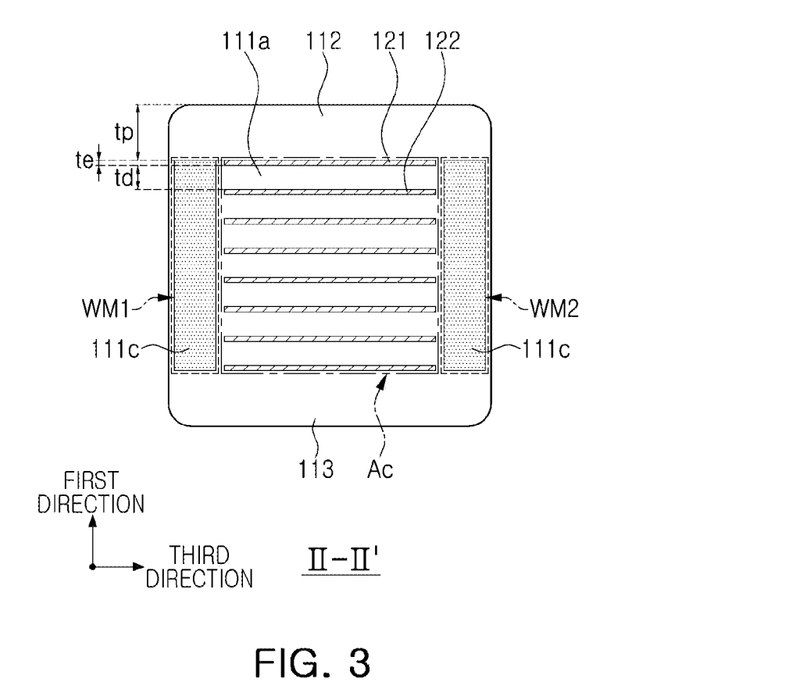
FIG. 3 is a cross-sectional view of FIG. 1, taken along line II-II'.
Figure 4:
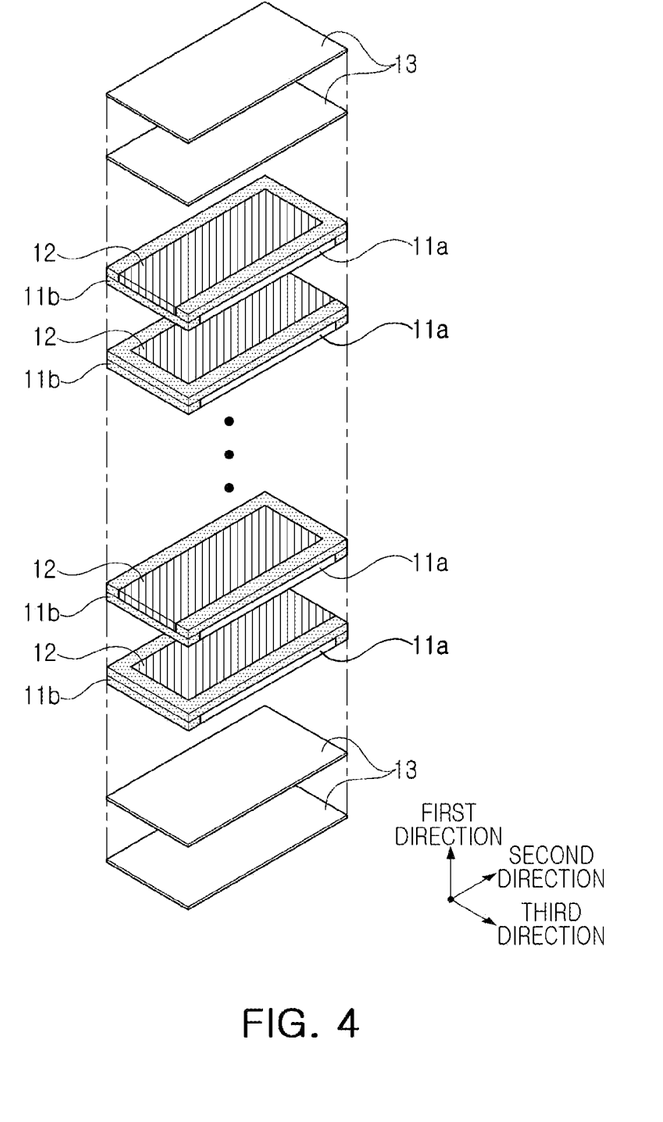
FIG. 4 is an exploded perspective diagram illustrating a laminate structure of internal electrodes according to an example embodiment of the present disclosure.

FIG. 1 is a perspective view illustrating a multilayer electronic component according to an exemplary embodiment in the present disclosure;

FIG. 2 is a cross-sectional view of FIG. 1, taken along line I-I';

FIG. 3 is a cross-sectional view of FIG. 1, taken along line II-II';

FIG. 4 is an exploded perspective diagram illustrating a laminate structure of internal electrodes according to an example embodiment of the present disclosure.

Hereinafter, a multilayer electronic component 100 according to an exemplary embodiment in the present disclosure will be described with reference to FIGS. 1 through 4.

The multilayer electronic component 100 according to an exemplary embodiment in the present disclosure includes a body 110 including a first dielectric layer 111a and internal electrodes 121 and 122 alternately disposed with the first dielectric layer 111a in a first direction and including first and second surfaces 1 and 2 opposing each other in the first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction; and external electrodes 131 and 132 disposed on the third and fourth surfaces 3 and 4, wherein the internal electrodes 121 and 122 include body portions 121a and 122a alternately disposed with the first dielectric layer 111a in the first direction to form capacitance, and end portions 121b and 122b extending from the body portions 121a and 122a in the second direction, and when a region including the first dielectric layer 111a and the body portions 121a and 122a in the body 110 is a capacitance forming portion Ac and regions disposed on one surface and the other surface of the capacitance forming portion Ac in the second direction and including the end portions 121b and 122b of the internal electrodes are first margin portions LM1 and LM2, the first margin portions LM1 and LM2 are disposed between the end portions 121b and 122b of the internal electrodes and include a second dielectric layer 111b including $Ta_4AlC_3$.

Referring to FIG. 2, the body 110, the dielectric layer 111 and the internal electrodes 121 and 122 are alternately disposed.

Although a specific shape of the body 110 is not particularly limited, as shown, the body 110 may have a hexahedral shape or a shape similar thereto. Due to the shrinkage of ceramic powder included in the body 110 during a sintering process, the body 110 may not have a perfectly straight hexahedral shape but may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

The plurality of dielectric layers 111 forming the body 110 are in a sintered state, and adjacent dielectric layers 111 may be integrated so that boundaries therebetween cannot be identified without using a scanning electron microscope (SEM). In the present disclosure, the dielectric layer 111 is described as including the first dielectric layer 111a and the second dielectric layer 111b, but is not necessarily limited thereto, and additional other dielectric layers may also be included.

Referring to FIG. 2, in an exemplary embodiment in the present disclosure, the body includes the first dielectric layer 111a and the second dielectric layer 111b.

Specifically, the first dielectric layer 111a may refer to a dielectric layer disposed between the first internal electrode 121 and the second internal electrode 122. Due to the first dielectric layer 111a overlapping the first and second internal electrodes 121 and 122 in the first direction and connection to the external electrodes, capacitance may be formed.

A material for forming the first dielectric layer 111a is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder, and the ceramic powder may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca, Zr, and the like are partially dissolved in $BaTiO_3$.

In addition, as a material for forming the first dielectric layer 111a, various ceramic additives, organic solvents, binders, dispersants, etc. may be added to the powder, such as barium titanate ($BaTiO_3$) according to purposes of the present disclosure. In some embodiments, the first dielectric layer 111a may not substantially include $Ta_4AlC_3$. In some embodiments, the content of $Ta_4AlC_3$ in the first dielectric layer 111a may be 0.5 wt % or less, preferably, 0.1 wt % or less, relative to the total weight of the composition for forming the first dielectric layer 111a.

The second dielectric layer 111b may refer to a dielectric layer disposed between the first internal electrode 121 and another adjacent first internal electrode 121 or between the second internal electrode 122 and another adjacent second internal electrode 122. That is, the second dielectric layer 111b is disposed between the end portions 121b and 122b of the internal electrodes to be described below and is included in the first margin portions LM1 and LM2 to be described below. The second dielectric layer 111b may be included in the first margin portions LM1 and LM2 together with the end portions 121b and 122b of the internal electrodes to serve to protect the capacitance forming portion Ac from an external environment and secure connectivity with the external electrodes 131 and 132 to be described below. A raw material forming the second dielectric layer 111b may include $Ta_4AlC_3$ or may include $Ta_4AlC_3$ in addition to a material forming the first dielectric layer 111a.

Meanwhile, an average thickness td of the first dielectric layer 111a may not be particularly limited. For example, the average thickness td of the first dielectric layer 111a may be 0.2 μm or more and 2 μm or less.

The average thickness td of the first dielectric layer 111a may refer to an average thickness td of the first dielectric layer 111a disposed between the first and second internal electrodes 121 and 122.

The average thickness td of the first dielectric layer 111a may be measured by scanning an image of a cross-section of the body 110 in the length-thickness (L-T) direction with a scanning electron microscope (SEM) having a magnification of 10,000. More specifically, the average value may be measured by measuring the thickness of one dielectric layer at 30 equally spaced points in the longitudinal direction in the scanned image. The 30 points at equal intervals may be designated in the capacitance forming portion Ac. In addition, if the average value is measured by extending the measurement of the average value to 10 dielectric layers, the average thickness of the dielectric layers may be more generalized. Other methods and/or tools appreciated by one of ordinary skill in the art, even if not described in the present disclosure, may also be used.

The internal electrodes 121 and 122 are alternately disposed with the first dielectric layer 111a in the first direction.

The internal electrodes 121 and 122 may include first and second internal electrodes 121 and 122. In an exemplary embodiment in the present disclosure, the internal electrodes 121 and 122 include body portions 121a and 122a alternately disposed in the first direction to form capacitance and end portions 121b and 122b disposed to extend from the body portions 121a and 122a in the second direction, respectively.

Since the body portions 121a and 122a are alternately disposed with the first dielectric layer 111a in the first direction, the body portions 121a and 122a may be portions contributing to formation of capacitance when the internal electrodes 121 and 122 are connected to the external electrodes and then a voltage is applied to the multilayer electronic component 100. Preferably, the capacitance of the multilayer electronic component 100 may increase as an overlapping area between the body portion 121a of the first internal electrode and the body portion 122a of the second internal electrode increases.

The end portions 121b and 122b may extend in the second direction from the body portions 121a and 122a and form a portion of first margin portions LM1 and LM2 to be described below. In the case of an exemplary embodiment in the present disclosure in which the external electrodes 131 and 132 are disposed on the third and fourth surfaces 3 and 4, the end portions 121b and 122b may be disposed to extend from the body portions 121a and 122a in the second direction to serve to electrically connect the internal electrodes 121 and 122 and the external electrodes 131 and 132. Preferably, the end of the end portion 121b of the first internal electrode may be in direct contact with the first external electrode 131 and the end of the end portion 122b of the second internal electrode may be in direct contact with the second external electrode 132, so that electrical connectivity between the internal electrodes 121 and 122 and the external electrodes 131 and 132 may be improved, and when different voltages of the external electrodes 131 and 132 are applied, the capacitance forming portion Ac, which will be described below, may form capacitance.

The first external electrode 131 is disposed on the third surface 3 of the body and connected to the first internal electrode 121, and a second external electrode 132 is disposed on the fourth surface 4 of the body to make the second external electrode 132 connected to the second internal electrode 122.

That is, the first internal electrode 121 is not connected to the second external electrode 132 but connected to the first external electrode 131, and the second internal electrode 122 is not connected to the first external electrode 131 but may be connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently sintering the green sheets.

A material for forming the internal electrodes 121 and 122 is not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on a ceramic green sheet. A printing method of the conductive paste for internal electrodes may be a screen printing method or a gravure printing method, but the present disclosure is not limited thereto.

In addition, an average thickness te of the internal electrodes 121 and 122 may not be particularly limited. For example, the average thickness te of the internal electrodes 121 and 122 may be 0.2 μm or more and 2 μm or less.

However, in general, in a case in which the internal electrodes are formed to be thin to have a thickness less than 0.6 μm, in particular, if the thickness of the internal electrodes is 0.35 μm or less, the reliability of the multilayer electronic component 100 may be more problematic.

According to an exemplary embodiment in the present disclosure, since the second dielectric layer 111b included in the first margin portions LM1 and LM2 includes $Ta_4AlC_3$, reliability may be improved even when the average thickness te of the internal electrodes 121 and 122 is 0.35 μm or less.

Therefore, when the thickness of the internal electrodes 121 and 122 is 0.35 μm or less, the effect according to the present disclosure may be more remarkable and miniaturization and high capacitance of the ceramic electronic component may be more easily achieved.

The average thickness te of the internal electrodes 121 and 122 may refer to an average thickness te of the internal electrodes 121 and 122.

The average thickness te of the internal electrodes 121 and 122 may be measured by scanning an image of a cross-section of the body 110 in the length-thickness (L-T) direction with a scanning electron microscope (SEM) having a magnification of 10,000. More specifically, the average value may be measured by measuring the thickness of one internal electrode at 30 equally spaced points in a longitudinal direction in the scanned image. The 30 points at equal intervals may be designated in the capacitance forming portion Ac. In addition, if the average value is measured by extending the measurement of the average value to 10 internal electrodes, the average thickness of the internal electrodes may be more generalized. Other methods and/or tools appreciated by one of ordinary skill in the art, even if not described in the present disclosure, may also be used.

In the body 110 according to an exemplary embodiment in the present disclosure, a region including the first dielectric layer 111a and the body portions 121a and 122a is defined as the capacitance forming portion Ac. The capacitance forming portion Ac is a region including the first dielectric layer 111a and the body portions 121a and 122a of the internal electrodes alternately disposed with the first dielectric layer interposed therebetween 111a interposed therebetween, and may refer to a region in which the internal electrodes 121 and 122 overlap each other when viewed in the first direction and is a portion contributing to formation of capacitance of the capacitor. Meanwhile, the capacitance forming portion Ac includes the body portion 121a of the first internal electrode, the body portion 122a of the second internal electrode, and the first dielectric layer 111a.

In addition, in the body 110 according to an exemplary embodiment in the present disclosure, regions disposed on one surface and the other surface of the capacitance forming portion Ac in the first direction and including the end portions 121b and 122b of the internal electrodes may be referred to as the first margin portions LM1 and LM2. The first margin portions LM1 and LM2 are regions including the end portions 121b and 122b of the internal electrodes. Specifically, the first margin portion LM1 is a region including the end portion 121b of the first internal electrode, and the first margin portion LM2 is a region including the end portion 122b of the second internal electrode, and may serve to apply different voltages to the first internal electrode 121 and the second internal electrode 122 through direct connection with the external electrodes 131 and 132.

The first margin portions LM1 and LM2 are regions disposed on one surface and the other surface of the capacitance forming portion Ac in the second direction. As described above, since the internal electrodes 121 and 122 include the end portions 121b and 122b extending from the body portions 121a and 122a in the second direction, the first margin portions LM1 and LM2 include the end portions 121b and 122b of the internal electrodes. Specifically, the first margin portion LM1 includes the end portion 121b of the first internal electrode, and the first margin portion LM2 includes the end portion 122b of the second internal electrode.

Since the first margin portions LM1 and LM2 include the end portions 121b and 122b of the internal electrodes, they may serve to secure connectivity with the external electrodes 131 and 132, and at the same time, the first margin portions LM1 and LM2 may serve to protect the capacitance forming portion Ac from penetration of external moisture or plating solution and external impact.

The external electrodes 131 and 132 may be disposed on the third surface 3 and the fourth surface 4 of the body 110. The external electrodes 131 and 132 may include first and second external electrodes 131 and 132 respectively disposed on the third and fourth surfaces 3 and 4 of the body 110 and connected to the first and second internal electrodes 121 and 122, respectively.

In the present exemplary embodiment, a structure in which the multilayer electronic component 100 has two external electrodes 131 and 132 is described, but the number and shape of the external electrodes 131 and 132 depend on the shape of the internal electrodes 121 and 122 or other purposes.

Meanwhile, the external electrodes 131 and 132 may be formed using any material having electrical conductivity, such as metal, and a specific material may be determined in consideration of electrical characteristics, structural stability, and the like, or may have a multilayer structure.

For example, the external electrodes 131 and 132 may include electrode layers 131a and 132a disposed on the body 110 and plating layers 131b and 132b formed on the electrode layers 131a and 132a.

As a more specific example of the electrode layers 131a and 132a, the electrode layers 131a and 132a may be a fired electrode including a conductive metal and glass or a resin-based electrode including a conductive metal and resin.

In addition, the electrode layers 131a and 132a may have a form in which a fired electrode and a resin-based electrode are sequentially formed on the body. Also, the electrode layer may be formed by transferring a sheet including a conductive metal onto the body or by transferring a sheet including a conductive metal onto a fired electrode.

As the conductive metal included in the electrode layers 131a and 132a, a material having excellent electrical conductivity may be used and is not particularly limited. For example, the conductive metal may be at least one of nickel (Ni), copper (Cu), and alloys thereof, and preferably, copper (Cu) to improve adhesion with the body.

The plating layers 131b and 132b serves to improve mounting characteristics. The type of the plating layers 131b and 132b is not particularly limited and may be a plating layer including at least one of Ni, Sn, Pd, and alloys thereof, and may be formed of a plurality of layers.

For a more specific example of the plating layers 131b and 132b, the plating layer may be a Ni plating layer or a Sn plating layer, may be a form in which a Ni plating layer and a Sn plating layer are sequentially formed on the electrode layer, and a form in which a Sn plating layer, a Ni plating layer, and a Sn plating layer are sequentially formed. Furthermore, the plating layer may include a plurality of Ni plating layers and/or a plurality of Sn plating layers.

In the conventional case, in order to protect the capacitance forming portion Ac of the multilayer electronic component from external impact, an attempt has been made to improve hardness of surfaces of the first margin portions LM1 and LM2, and to this end, there has been an attempt to add a sintering accelerator or the like to the first dielectric layer 111a. However, since sintering accelerators may have a large difference in coefficient of thermal expansion from a ceramic material included in the first dielectric layer 111a, a step portion difference may occur due to uneven expansion and contraction of the capacitance forming portion Ac and the first margin portions LM1 and LM2 after compression and sintering. The step portion difference may be a main cause of significant bending of the end portions 121b and 122b of the internal electrodes, which are the ends of the internal electrodes and are included in the first margin portions LM1 and LM2. Accordingly, contact between the internal electrode and the external electrode of the multilayer electronic component may be weakened, resulting in a decrease in moisture resistance due to external moisture.

Therefore, in an exemplary embodiment in the present disclosure, the second dielectric layer 111b included in the first margin portions LM1 and LM2 includes $Ta_4AlC_3$ to cancel off pressure applied to the capacitance forming portion Ac and the first margin portions LM1 and LM2 and alleviate uneven expansion and contraction to suppress a step portion difference after compression and sintering.

$Ta_4AlC_3$ corresponds to a material having high density and hardness among tantalum-aluminum compounds (Density: 13.18 g/cm$^3$, Vickers hardness: 5.1±0.1 GPa). When the second dielectric layer 111b included in the first margin portions LM1 and LM2 of the present disclosure includes $Ta_4AlC_3$, the density and hardness of the first margin portions LM1 and LM2 may be improved, thereby improving the effect of protecting the capacitance forming portion Ac from external impact, moisture, and plating solution. Meanwhile, since the first margin portions LM1 and LM2 include only one of the first internal electrode 121 and the second internal electrode 122, expansion and contraction behaviors of the first margin portions LM1 and LM2 may be different from those of the capacitance forming portion Ac including both the first internal electrode 121 and the second internal electrode 122. Specifically, in the process of forming the body 110 according to an exemplary embodiment in the present disclosure, the capacitance forming portion Ac and the first margin portions LM1 and LM2 may be compressed and fired under the same conditions at the same time. When the same pressure is simultaneously applied to the capacitance forming portion Ac and the first margin portions LM1 and LM2 during the compression process, the end portions 121b and 122b of the internal electrodes included in the first margin portions LM1 and LM2 may be bent according to a difference in degree of stacking of the internal electrodes 121 and 122, and when a thermal cycle is simultaneously performed on the capacitance forming portion Ac and the first margin portions LM1 and LM2 during the sintering process, a step portion difference may be formed due to the difference in expansion and contraction. The step portion difference between the capacitance forming portion Ac and the first margin portions LM1 and LM2 may further improve the degree of bending of the end portions 121b and 122b of the internal electrodes included in the first margin portions LM1 and LM2. However, since the second dielectric layer 111b included in the first margin portion according to an exemplary embodiment in the present disclosure includes $Ta_4AlC_3$, the pressure is canceled out despite the difference in stacking degree between the capacitance forming portion Ac and the first margin portions LM1 and LM2, thereby alleviating bending of the end portions 121b and 122b of the internal electrodes, and since $Ta_4AlC_3$ has a low coefficient of thermal expansion of $(8.2\pm0.3)\cdot10^{-6}\cdot K^{-1}$ level, the difference in the degree of expansion and contraction during the sintering process may also be alleviated, thereby reducing the step portion difference between the capacitance forming portion Ac and the first margin portions LM1 and LM2 to further improve the effect of preventing the end portions 121b and 122b of the internal electrodes from bending.

In order to determine whether $Ta_4AlC_3$ is included in the first margin portions LM1 and LM2 and measure a content thereof, methods, such as inductively coupled plasma spectroscopy (ICP), scanning electron microscope-energy dispersive X-ray spectroscopy (SEM-EDS), transmission electron microscope-energy dispersive X-ray spectroscopy (TEM-EDS), and X-ray photoelectron spectroscopy (XPS) may be used. For example, in the case of using the XPS, after cutting the first margin portions LM1 and LM2 to prepare a plate-shaped or block-shaped sample, inert gas molecules may be ionized, and the sample may be accelerated at 0.5 to 5 kV so that a surface layer of the sample is peeled and then measured in a high vacuum of 10-9 torr or higher. Other methods and/or tools appreciated by one of ordinary skill in the art, even if not described in the present disclosure, may also be used.

In an exemplary embodiment, an average number of pores per unit area of the second dielectric layer 111b may be smaller than an average number of pores per unit area of the first dielectric layer 111a. Accordingly, the density of the second dielectric layer 111b may be higher than that of the first dielectric layer 111a so that the effect of protecting the capacitance forming portion Ac by the first margin portions LM1 and LM2 from external impact, moisture, and a plating solution may be further improved. The method of adjusting the average value of the number of pores per unit area of the first dielectric layer 111a and the second dielectric layer 111b is not particularly limited, and for example, a method of adjusting the content of $Ta_4AlC_3$ included in the second dielectric layer 111b or adding a separate sintering accelerator to the second dielectric layer 111b may be used.

A method of measuring the average value of the number of pores per unit area of the first and second dielectric layers 111a and 111b is not particularly limited. For example, in cross-sections in the first and second directions cut in the central portion of the multilayer electronic component in the third direction, a region in which the internal electrodes 121 and 122 are stacked may be trisected, and the number of pores included in the first and second dielectric layers 111a and 111b in a middle region thereof may be measured through a scanning electron microscope (SEM). At this time, a central portion of the first and second dielectric layers 111a and 111b to be measured may come to the center of an image and the number of pores may be measured at 21.15 μm×28.20 μm at a magnification of 10,000 and may be measured by calculating the number of pores compared to the entire region appearing in the image using an image program. At this time, the number of pores was the number of pores having a maximum diameter of 0.1 μm or more. An average value of the number of pores per unit area may be measured by taking the average value of the number of pores per unit area measured in five or more first and second dielectric layers 111a and 111b. Other methods and/or tools appreciated by one of ordinary skill in the art, even if not described in the present disclosure, may also be used.

In an exemplary embodiment, an average thickness td' of the second dielectric layer 111b may be greater than the average thickness td of the first dielectric layer 111a. Accordingly, a proportion occupied by the second dielectric layer 111b including $Ta_4AlC_3$ in the first margin portions LM1 and LM2 may be increased to further improve the effect of preventing the end portions 121b and 122b of the internal electrode from bending according to the present disclosure. In an exemplary embodiment, in order to maximize the proportion occupied by the second dielectric layer 111b including $Ta_4AlC_3$ in the first margin portions LM1 and LM2, the average thickness td' of the second dielectric layer 111b may be more than twice the average thickness td. Meanwhile, the average thickness td' of the second dielectric layer may refer to a first directional average size measured in certain five or more first dielectric layers excluding the lowermost first dielectric layer of the first margin portion LM1 and the uppermost first dielectric layer of the first margin portion LM2 in the cross-section in the first and second directions cut in the central portion of the multilayer electronic component 100 in the third direction. The average thickness td' of the second dielectric layer may be measured by the methods and/or tools described herein or appreciated by one of ordinary skill in the art, even if not described in the present disclosure.

In an exemplary embodiment, the end portions 121b and 122b of the internal electrodes may be substantially parallel to the second direction. As in an exemplary embodiment in the present disclosure, since the second dielectric layer including $Ta_4AlC_3$ is disposed between the end portions 121b and 122b of the internal electrodes, the pressure during compression and sintering may be canceled out and the step portion difference may be alleviated, so that the bending of the end portions 121b and 122b of the internal electrodes may be minimized, and, preferably, the end portions 121b and 122b of the internal electrodes may be substantially parallel to the second direction. Accordingly, since adhesion between the internal electrodes 121 and 122 and the external electrodes 131 and 132 may be improved, the frequency of occurrence of moisture cracks in the multilayer electronic component may be reduced. Whether the end portions 121b and 122b of the internal electrodes are substantially parallel to the second direction may be determined by measuring an average value of angles formed by straight lines connecting points of the end portions 121b and 122b of certain five or more internal electrodes in contact with the capacitance forming portion Ac and points in contact with the external electrodes with the second direction. At this time, preferably, a case in which the average value of angles formed by straight lines connecting points of the end portions 121b and 122b of certain five or more internal electrodes in contact with the capacitance forming portion Ac and points in contact with the external electrodes with the second direction is 5 degrees or less may be considered as being substantially parallel. Other methods and/or tools appreciated by one of ordinary skill in the art, even if not described in the present disclosure, may also be used.

In an exemplary embodiment, the third surface 3 and the fourth surface 4 of the body 110 may be substantially parallel to the first direction. As in an exemplary embodiment in the present disclosure, since the second dielectric layer including $Ta_4AlC_3$ is disposed between the end portions 121b and 122b of the internal electrodes, the pressure during compression and sintering may be canceled out and the step portion difference may be alleviated, so that the difference in contraction behavior between the first dielectric layer 111a and the second dielectric layer 111b may also be alleviated. As a result, the third surface 3 and the fourth surface 4 of the body 110 may be formed substantially parallel to the first direction, and thus mounting of the multilayer electronic component 100 with respect to a substrate may be improved. Whether the third surface 3 and the fourth surface 4 are substantially parallel to the first direction may be determined by specifying an average value of angles formed by the tangent lines at certain five points equally spaced in the first direction in a region in which the third surface 3 and the fourth surface 4 are in contact with the ends of the end portions 121b and 122b of the internal electrodes in the second direction with the first direction. At this time a case in which the average value of angles formed by the tangent lines at certain five points equally spaced in the first direction in the region in which the third surface 3 and the fourth surface 4 are in contact with the ends of the end portions 121b and 122b of the internal electrodes in the second direction with the first direction is 5 degrees or less may be considered as being substantially parallel.

In an exemplary embodiment, the first dielectric layer 111a may include an oxide including Ba and Ti, and the second dielectric layer 111b may further include an oxide including Ba and Ti. In an exemplary embodiment, the first dielectric layer 111a and the second dielectric layer 111b may include substantially the same component as a main component, for example, a barium titanate-based material, a lead composite perovskite-based material, or a strontium titanate-based material may be used. Examples of the barium titanate-based material may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1) in which Ca, Zr, or the like, is partially dissolved in $BaTiO_3$. However, in an exemplary embodiment in the present disclosure, since $Ta_4AlC_3$ is included in the second dielectric layer 111b, the pressure and step portion difference may be canceled out despite the difference in the stacking degree of the internal electrodes between the capacitance forming portion Ac and the first margin portions LM1 and LM2, thereby minimizing bending of the internal electrode end portions 121b and 122b. In particular, since $Ta_4AlC_3$ included in the second dielectric layer 111b according to an exemplary embodiment in the present disclosure has a coefficient of thermal expansion (coefficient of thermal expansion of $Ta_4AlC_3$: $(8.2\pm0.3)\cdot10^{-6}\cdot K^{-1}$) lower than the coefficient of thermal expansion ($10\cdot10^{-6} K^{-1}$) of the typical oxide $BaTiO_3$ including Ba and Ti and has a density (density of $Ta_4AlC_3$: 13.18 g/cm$^3$) twice or more of the density of $BaTiO_3$, the effect of alleviating the step portion difference between the capacitance forming portion Ac and the first margin portions LM1 and LM2 and the effect of alleviating bending of the internal electrodes may be more remarkable. At this time, in order to maximize the effect of minimizing bending of the end portions 121b and 122b of the internal electrodes, the content of $Ta_4AlC_3$ in the second dielectric layer 111b is preferably 20 wt % or more compared to oxide, which includes Ba and Ti, present in the first and second dielectric layers 111a and 111b.

In an exemplary embodiment, the end portions 121b and 122b of the internal electrodes may not substantially include $Ta_4AlC_3$. "The end portions 121b and 122b of the internal electrodes do not substantially include $Ta_4AlC_3$" may mean that $Ta_4AlC_3$ does not penetrate or diffuse into the end portions 121b and 122b of the internal electrodes and may refer to a case in which the content of $Ta_4AlC_3$ is 0.5 wt % or less, preferably, 0.1 wt % or less, relative to Ni, when the components of the central portion of the end portions 121b and 122b are analyzed through TEM-EDX or XPS. Other methods and/or tools appreciated by one of ordinary skill in the art, even if not described in the present disclosure, may also be used.

When $Ta_4AlC_3$ of the second dielectric layer 111b disposed between the end portions 121b and 122b of the internal electrodes penetrates or diffuses into the end portions 121b and 122b of the internal electrodes, connectivity or electrical conductivity of the internal electrodes 121 and 122 may deteriorate. In an exemplary embodiment, the deterioration in performance may be prevented by substantially not including $Ta_4AlC_3$ in the end portions 121b and 122b of the internal electrodes.

In an exemplary embodiment, an upper cover portion 112 may be disposed on one surface of the capacitance forming portion Ac in the first direction, and a lower cover portion 113 may be included on the other surface of the capacitance forming portion Ac in the first direction.

The upper cover portion 112 and the lower cover portion 113 may be formed by stacking a single dielectric layer or two or more dielectric layers on the upper and lower surfaces of the capacitance forming portion Ac in the thickness direction, respectively, and basically, serve to prevent damage to the internal electrodes due to physical or chemical stress.

The upper cover portion 112 and the lower cover portion 113 may not include internal electrodes and may include the same material as that of the first dielectric layer 111a or the second dielectric layer 111b.

That is, the upper cover portion 112 and the lower cover portion 113 may include a ceramic material, for example, a barium titanate ($BaTiO_3$)-based ceramic material.

Meanwhile, an average thickness of the cover portions 112 and 113 may not be particularly limited. However, the average thickness tc of the cover portions 112 and 113 may be 15 μm or less in order to more easily achieve miniaturization and high capacitance of the multilayer electronic component.

The average thickness of the cover portions 112 and 113 may refer to a size in the first direction and may be a value obtained by averaging sizes of the cover portions 112 and 113 measured at five equally spaced points above or below the capacitance forming portion Ac.

In an exemplary embodiment, second margin portions WM1 and WM2 may be disposed on one surface and the other surface of the capacitance forming portion Ac in the third direction.

The second margin portions WM1 and WM2 may include a margin portion WM1 disposed on the fifth surface 5 of the body 110 and a margin portion WM2 disposed on the sixth surface 6 of the body 110. That is, the margin portions WM1 and WM2 may be disposed on both end surfaces of the body 110 in the third direction (width direction).

As shown in FIG. 3, the second margin portions WM1 and WM2 may refer to a region between both ends of the first and second internal electrodes 121 and 122 in the third direction and a boundary surface of the body 110 in a cross-section of the body 110 cut in the width-thickness (W-T) direction.

The second margin portions WM1 and WM2 may be formed by forming internal electrodes by applying a conductive paste on a ceramic green sheet except portions in which the margin portions are to be formed.

In addition, in order to suppress a step portion difference due to the internal electrodes 121 and 122, after stacking, the internal electrodes may be cut to expose to the fifth and sixth surfaces 5 and 6 of the body, and then a single dielectric layer or two or more dielectric layers may be stacked on both sides of the capacitance forming portion Ac in the third direction (the width direction) to form the second margin portions WM1 and WM2.

Meanwhile, the widths of the second margin portions WM1 and WM2 may not be particularly limited. However, in order to more easily achieve miniaturization and high capacitance of the multilayer electronic component, an average width of the second margin portions WM1 and WM2 may be 15 μm or less.

The average width of the second margin portions WM1 and WM2 may refer to an average size of the second margin portions WM1 and WM2 in the third direction, and may be a value obtained by averaging sizes of the second margin portions WM1 and WM2 in the third direction measured at five equally spaced points on a side surface of the capacitance forming portion Ac.

In an exemplary embodiment, the second margin portions WM1 and WM2 may include a third dielectric layer 111c, and the third dielectric layer may include $Ta_4AlC_3$. Also, in an exemplary embodiment, the second margin portions WM1 and WM2 may refer to regions not including the internal electrodes 121 and 122.

Since the second margin portions WM1 and WM2 are in contact with the ends of the body portions 121a and 122a of the internal electrodes in the third direction, the second margin portions WM1 and WM2 may serve to protect the capacitance forming portion Ac from external impact, moisture, and plating solution. Meanwhile, according to an exemplary embodiment, in a case in which the second margin portions WM1 and WM2 do not include internal electrodes, when the capacitance forming portion Ac and the second margin portions WM1 and WM2 are simultaneously compressed and fired, uneven pressure may be applied and a difference may occur in the degree of expansion and contraction. Accordingly, interfacial adhesion between the capacitance forming portion Ac and the second margin portions WM1 and WM2 may weaken and bending may occur at the ends of the body portions 121a and 122a of the internal electrodes in the third direction. In an exemplary embodiment, the second margin portions WM1 and WM2 are configured such that the third dielectric layer 111c includes $Ta_4AlC_3$, so that a phenomenon in which an uneven pressure is applied to the capacitance forming portion Ac and the second margin portions WM1 and WM2 and the difference in the degree of expansion and contraction may be alleviated.

As such, when the third dielectric layer 111c includes $Ta_4AlC_3$ to alleviate the phenomenon in which uneven pressure is applied to the capacitance forming portion Ac and the second margin portions WM1 and WM2 and the difference in the degree of expansion and contraction, the ends of the body portions 121a and 122a of the internal electrodes in the third direction may be substantially parallel to the third direction. Whether the ends of the body portions 121a and 122a of the internal electrodes in the third direction may be substantially parallel to the third direction may be determined by measuring an average value of angles formed by straight lines connecting the centers of the body portions 121a and 122a of certain five or more internal electrodes to a point at which the ends of the body portions 121a and 122a in the third direction are in contact with the second margin portions WM1 and WM2 with the third direction. At this time, preferably, a case in which the average value of angles formed by straight lines connecting the centers of the body portions 121a and 122a of certain five or more internal electrodes to a point at which the ends of the body portions 121a and 122a in the third direction are in contact with the second margin portions WM1 and WM2 with the third direction is 5 degrees or less may be considered as being substantially parallel. Other methods and/or tools appreciated by one of ordinary skill in the art, even if not described in the present disclosure, may also be used.

In an exemplary embodiment, an average value of the number of pores per unit area of the third dielectric layer 111c may be smaller than an average value of the number of pores per unit area of the first dielectric layer 111a. Accordingly, the density of the third dielectric layer 111c may be higher than that of the first dielectric layer 111a so that the effect of protecting the capacitance forming portion Ac by the second margin portions WM1 and WM2 from external impact, moisture, and plating solution may be further improved. The average value of the number of pores per unit area of the third dielectric layer 111c may be measured by the methods and/or tools disclosed herein or appreciated by one of ordinary skill in the art, even if not described in the present disclosure.

The size of the multilayer electronic component 100 may not be particularly limited.

However, in order to achieve miniaturization and high capacitance at the same time, the thickness of the dielectric layer and the internal electrode needs be reduced to increase the number of layers, and therefore, the effect of improving reliability according to the present disclosure may be more remarkable in the multilayer electronic component 100 having a size of 0603 (length×width, 0.6 mm×0.3 mm) or less.

Accordingly, when the multilayer electronic component 100 has a length of 0.66 mm or less and a width of 0.33 mm or less, considering manufacturing errors, the size of the external electrode, etc., reliability improvement effect according to the present disclosure may be more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

FIG. 4 is an exploded perspective diagram illustrating a laminate structure of internal electrodes according to an example embodiment of the present disclosure.

Referring to FIG. 4, internal electrode patterns 12 may be disposed on a first dielectric ceramic sheet 11a. The internal electrode patterns 12 may be formed to be alternately exposed to one end and the other end in the second direction on the first dielectric ceramic sheet 11a. In the internal electrode patterns 12, regions formed on the first dielectric ceramic sheet 11a may form body portions of internal electrodes after sintering, and regions alternately exposed to one end and the other end in the second direction on the first dielectric ceramic sheet 11a may form end portions 121b and 122b of the internal electrodes after sintering.

Second dielectric ceramic sheets 11b may be disposed on both ends of the first dielectric ceramic sheet 11a in the second direction and both ends of the internal electrode patterns 12 in the third direction and ends in the second direction. After sintering, the second dielectric ceramic sheet 11b may form a second dielectric layer and a third dielectric layer. However, it should be noted that the third dielectric layer is not an essential component in an exemplary embodiment in the present disclosure. That is, unlike that shown in FIG. 4, the second dielectric ceramic sheet 11b may not be disposed at both ends of the internal electrode pattern 12 in the third direction. A third dielectric ceramic sheet 13 may be formed on one surface and the other surface in the first direction of the region in which the internal electrode pattern 12, the first dielectric ceramic sheet 11a, and the second dielectric ceramic sheet 11b are disposed in the first direction, and after sintering, the third dielectric ceramic sheet 13 may form a cover portion. Similarly, it should be noted that in an exemplary embodiment in the present disclosure, the cover portion is not an essential component. That is, unlike that shown in FIG. 4, the third dielectric ceramic sheet 13 may not be formed on one surface and the other surface of the region in which the internal electrode pattern 12, the first dielectric ceramic sheet 11a, and the second dielectric ceramic sheet 11b are disposed in the first direction. The first dielectric ceramic sheet 11a may include a material forming the first dielectric layer 111a described above, and the second dielectric ceramic sheet 11b may include a material forming the second dielectric layer 111b described above.

Figure 5:
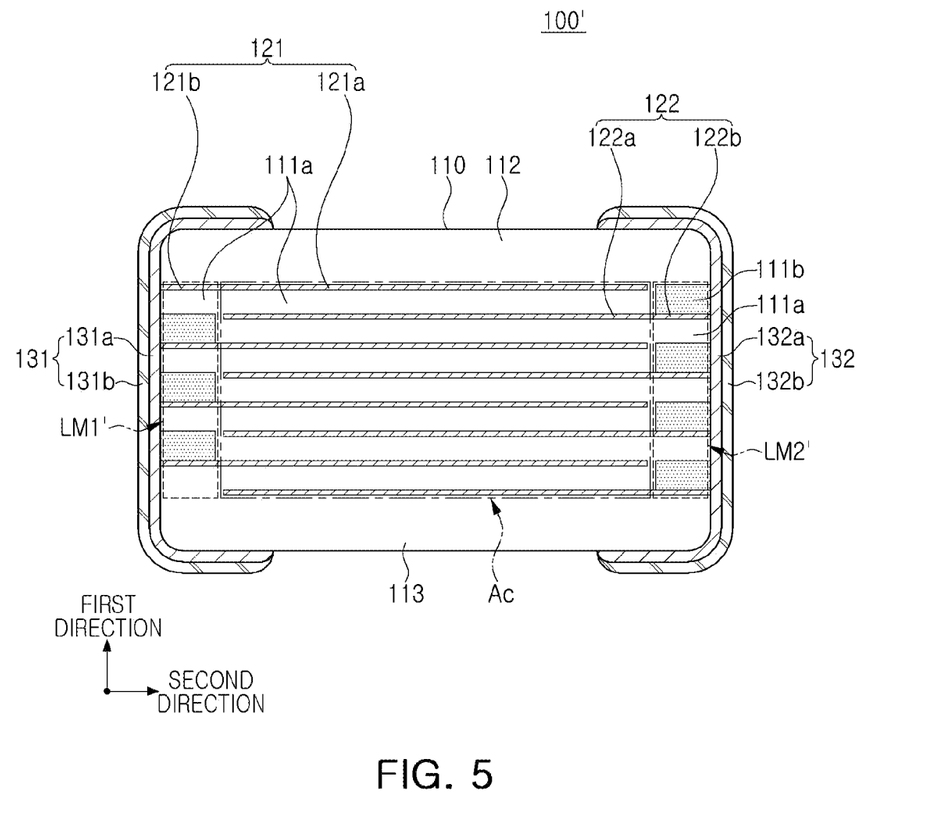
FIG. 5 is a cross-sectional view in a first direction and a second direction taken from a central portion in a third direction of a multilayer electronic component according to an exemplary embodiment.

FIG. 5 is a cross-sectional view in a first direction and a second direction cut at a central portion of a multilayer electronic component 100' in a third direction according to an exemplary embodiment.

Referring to FIG. 5, first margin portions LM1' and LM2' according to an exemplary embodiment may include end portions 121b and 122b of internal electrodes and a second dielectric layer 111b, and may further include the first dielectric layer 111a.

In the multilayer electronic component 100' according to an exemplary embodiment, the first dielectric layer 111a may be disposed to extend from a capacitance forming portion toward one surface or the other surface of the body 110 in the second direction. The second dielectric layer 111b may be disposed between a portion extending from the capacitance forming portion of the first dielectric layer 111a toward one surface or the other surface of the body 110 in the second direction and the end portions 121b and 122b of the internal electrodes. That is, the first margin portions LM1' and LM2' may be in a form in which the end portions 121b and 122b of the internal electrodes, the second dielectric layer 111b, and the first dielectric layer 111a are stacked in the first direction. Accordingly, there is an advantage in that the first margin portions LM1' and LM2' including the second dielectric layer 111b may be simultaneously compressed and fired together with the capacitance forming portion Ac.

One of the various effects of the present disclosure is to suppress a step portion difference between a capacitance forming portion and a margin portion by including a material having a coefficient of thermal expansion smaller than that of a main component of a dielectric layer of a capacitance forming portion and a greater density in a margin dielectric layer.

One of the various effects of the present disclosure is to suppress bending of the ends of internal electrodes by securing adhesion between the ends of the internal electrodes and the ends of the dielectric layer and suppressing a step portion difference between the capacitance forming portion and the margin portion.

One of the various effects of the present disclosure is to improve mountability, high-temperature and moisture-resistant reliability of the multilayer electronic component by achieving the various effects described above.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
   a body including a first dielectric layer and internal electrodes alternately disposed with the first dielectric layer interposed therebetween in a first direction, the body comprising first and second surfaces opposing each other in the first direction, third and fourth surfaces connected to the first and second surfaces and opposing each other in a second direction, and fifth and sixth surfaces connected to the first to fourth surfaces and opposing each other in a third direction; and
   external electrodes disposed on the third and fourth surfaces,
   wherein:
   the internal electrodes include:
      body portions alternately disposed with the first dielectric layer in the first direction to form capacitance, and
      end portions extending from the body portions in the second direction, and
   a region including the first dielectric layer and the body portions in the body is a capacitance forming portion,
   regions disposed on one surface and the other surface of the capacitance forming portion in the second direction and including the end portions of the internal electrodes are first margin portions, and
   at least one of the first margin portions includes a second dielectric layer including $Ta_4AlC_3$, and the second dielectric layer is disposed between the end portions of the internal electrodes.

2. The multilayer electronic component of claim 1, wherein an average value of a number of pores per unit area of the second dielectric layer is smaller than an average value of a number of pores per unit area of the first dielectric layer.

3. The multilayer electronic component of claim 1, wherein an average thickness of the second dielectric layer is greater than an average thickness of the first dielectric layer.

4. The multilayer electronic component of claim 3, wherein the average thickness of the second dielectric layer is more than twice the average thickness of the first dielectric layer.

5. The multilayer electronic component of claim 1, wherein an end of at least one of the internal electrodes is substantially parallel to the second direction.

6. The multilayer electronic component of claim 1, wherein the third and fourth surfaces are substantially parallel to the first direction.

7. The multilayer electronic component of claim 1, wherein:
at least one of the external electrodes includes an electrode layer disposed on the body and a plating layer disposed on the electrode layer, and
the electrode layer includes Cu.

8. The multilayer electronic component of claim 1, wherein:
the first dielectric layer includes a first oxide including Ba and Ti,
the second dielectric layer includes a second oxide including Ba and Ti, and
a content of $Ta_4AlC_3$ of the second dielectric layer is 20 wt % or more compared to the first and second oxides.

9. The multilayer electronic component of claim 1, wherein an end of at least one of the internal electrodes does not substantially include $Ta_4AlC_3$.

10. The multilayer electronic component of claim 1, wherein:
the body further includes a second margin portion disposed on one surface and the other surface of the capacitance forming portion in the third direction,
the second margin portion includes a third dielectric layer, and
the third dielectric layer includes $Ta_4AlC_3$.

11. The multilayer electronic component of claim 10, wherein an average value of a number of pores per unit area of the third dielectric layer is smaller than an average value of a number of pores per unit area of the first dielectric layer.

12. The multilayer electronic component of claim 10, wherein the second margin portion does not include the internal electrodes.

13. The multilayer electronic component of claim 10, wherein an end of at least one of the body portions in the third direction is substantially parallel to the third direction.

14. A multilayer electronic component comprising:
a body including:
a capacitance forming portion including:
a first dielectric layer, and
internal electrodes alternately disposed with the first dielectric layer interposed therebetween in a first direction, and
a first margin portion disposed on opposing surfaces of the capacitance forming portion, the first margin portion including:
a second dielectric layer including $Ta_4AlC_3$, and
end portions of the internal electrodes;
and external electrodes disposed on the body.

15. The multilayer electronic component of claim 14, wherein the second dielectric layer is disposed between end portions of the internal electrodes.

16. The multilayer electronic component of claim 14, wherein an average value of a number of pores per unit area of the second dielectric layer is smaller than an average value of a number of pores per unit area of the first dielectric layer.

17. The multilayer electronic component of claim 14, wherein an average thickness of the second dielectric layer is greater than an average thickness of the first dielectric layer.

18. The multilayer electronic component of claim 17, wherein the average thickness of the second dielectric layer is more than twice the average thickness of the first dielectric layer.

19. The multilayer electronic component of claim 14, wherein:
the body comprises first and second surfaces opposing each other in the first direction, third and fourth surfaces connected to the first and second surfaces and opposing each other in a second direction, and fifth and sixth surfaces connected to the first to fourth surfaces and opposing each other in a third direction, and
the end portions are substantially parallel to the second direction.

20. The multilayer electronic component of claim 19, wherein:
the body further includes a second margin portion disposed on one surface and the other surface of the capacitance forming portion in the third direction,
the second margin portion includes a third dielectric layer including $Ta_4AlC_3$.

21. The multilayer electronic component of claim 20, wherein the second margin portion does not include the internal electrodes.

22. The multilayer electronic component of claim 14, wherein the first dielectric layer does not substantially include $Ta_4AlC_3$.

* * * * *